March 28, 1961 P. E. HANSEN ET AL 2,976,646
GRASS-GROWING FABRIC
Filed April 1, 1958
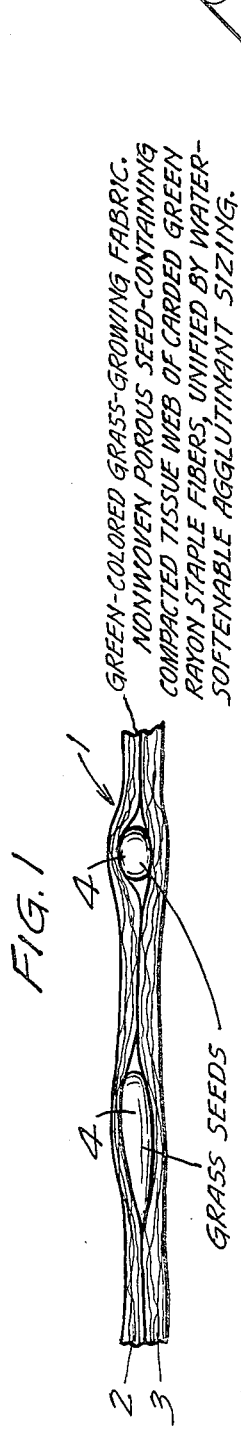
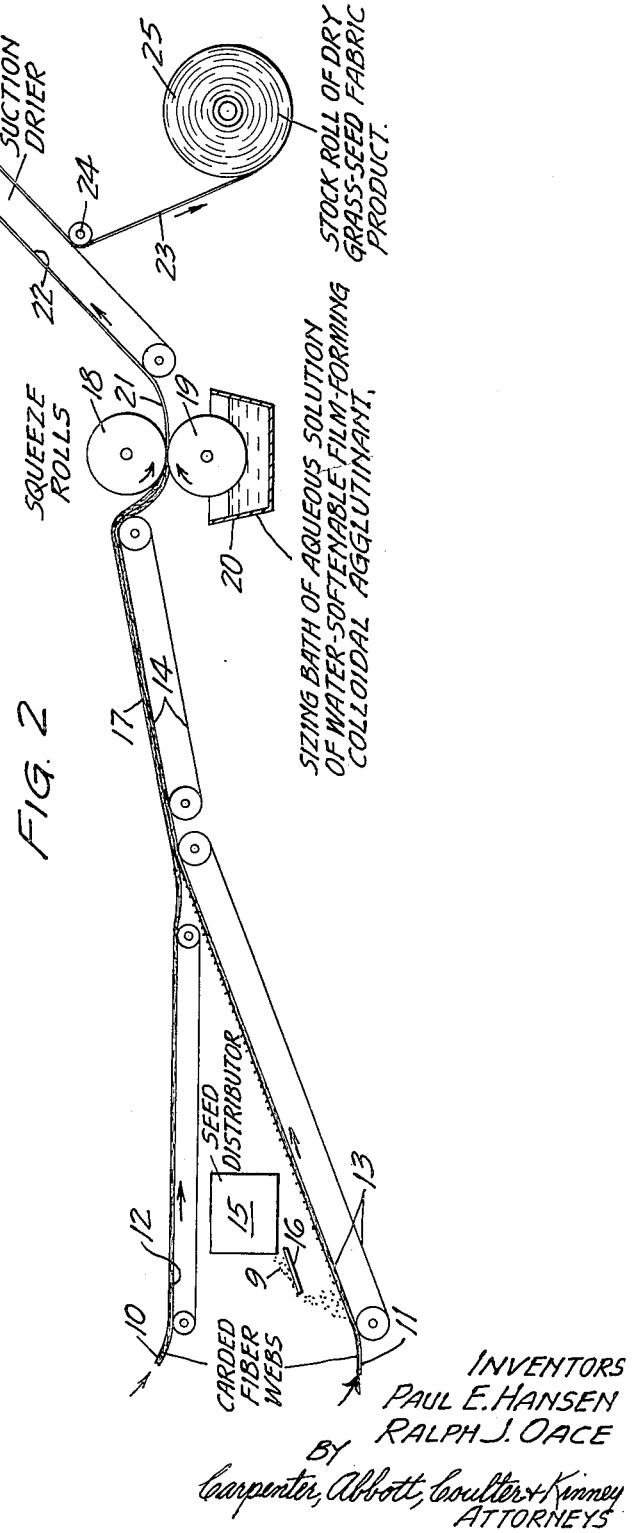
INVENTORS
PAUL E. HANSEN
RALPH J. OACE
BY
Carpenter, Abbott, Coulter & Kinney
ATTORNEYS

2,976,646
GRASS-GROWING FABRIC

Paul E. Hansen, North St. Paul, and Ralph J. Oace, East Oakdale Township, Washington County, Minn., assignors to Minnesota Mining and Manufacturing Company, St. Paul, Minn., a corporation of Delaware Filed Apr. 1, 1958, Ser. No. 725,532

5 Claims. (Cl. 47—56)

This invention relates to a novel seed-containing ground-covering grass-growing fabric and to a process of manufacturing.

The nonwoven porous fibrous tissue fabric contains grass seed which is enabled to germinate, take root in the soil, and grow; after laying down of the fabric on the surface of the prepared ground and wetting from time to time to maintain the soil and seed in a moist condition during the required period. The exposed fabric disintegrates in due course and the fibers work into the soil and ultimately decompose.

More particularly, our novel grass-seed fabric is a thin lightweight, even diaphanous, compacted tissue web of long nonbundled interlaced rayon staple fibers (or the like) within the body of which the grass seed is uniformly distributed and entrapped. The composite fabric is sized and unified by a water-softenable agglutinant which temporarily binds the fibers to each other and the seeds to the fibers, but permits of gradual disintegration of the fabric as it serves its purpose in establishing a grassy area. The agglutinant does not materially affect the porosity or weight of the fabric, being present as extremely thin sizing coatings on the fibers and seeds. The fibers are hydrophilic (water-wettable) and water-absorptive. The lightness of the product is such that the grass seed can account for half of its total weight.

Particularly noteworthy features of our grass-seed fabric are: It clings to the soil surface from and after the first wetting and is self-retentive. No coverage with soil is needed either to cause proper germination and growth of the grass or to retain the fabric in place, and no pegging is needed. The fabric prevents both water and wind erosion and provides soil-stabilization even on steep slopes until the grass is established and takes over this function. It serves as a barrier which prevents the growth of weeds (from weed seeds inevitably present in the soil and often in the grass seed) during the first crucial period when the grass is getting its start, yet does not act as a barrier to upcoming blades of grass. It does not leave any trashy residue on the ground to be cleared off when the grass has grown.

Also noteworthy are the following further desirable features: The fabric is very light in weight and can be supplied in large easy to handle rolls. It is easy to apply in covering large areas upon which grass is to be grown, including slopes and embankments. The grass seed is automatically supplied to the area in a desired preselected amount per unit area and with uniform distribution. The fabric has adequate unification and dry strength for handling and installation and yet is very pliant and is conformable to surface contours and irregularities. Upon wetting down of the fabric, the softening of the agglutinant sizing permits the limp water-soaked fibers to slide over each other and to sag so that an intimate clinging contact to the earth surface is established. The agglutinant continues to provide wet adhesion between contacting fibers until dissipated. The thin fibrous structure and translucency expose the soil and seeds to the atmosphere and to sunlight during germination. The seeds and seedlings are held in place until the grass is established in the soil, not being transported away or moved about by rain or sprinkling or by wind action. The damp flimsy earth-clinging fabric is too thin and porous to be lifted up or blown about by the wind; and it is too weak to be stripped off or displaced by animals, mischief makers or vandals. The fabric has good wettability and the fibers do not dry out rapidly since they are water-absorptive and cling to the soil. The fabric continues to cling to the soil even if it becomes dry. Alternate wetting and drying does not cause the fibrous structure to lift up or to shrink, thus avoiding movement of the seedlings which is detrimental to healthy growth. The fabric is thin and porous enough to permit proper wetting of the soil and to permit of aeration that will prevent smothering or rotting of seeds and sprouts.

It is also advantageous that a grass-green fabric can readily be manufactured by using commercially available green rayon fibers so that no additional processing step or equipment is needed. Upon application of such fabric to the ground the covered area is not only readily identified but immediately assumes a somewhat grass-like appearance. Inspection of installation workmanship and coverage is easy. The color fools birds so they will not gather the fibers for lining nests. The need for sprinkling is automatically indicated since the fabric has a lighter-colored appearance when dry than when moist. The fibers are similar in color to the newly grown grass and do not detract from its appearance. Spun-dyed rayon staple fibers are available wherein the green coloration is a stable integral part of the fiber and will not leach out or fade out when the fabric is on the ground and exposed to water and sunlight.

It is well known that it is extremely difficult to start a good growth of grass on a slope or embankment subject to erosion. Seeding is difficult and the seed is readily washed away by rains and by sprinkling. Sodding is generally resorted to. This is expensive, especially when the sod must be transported a considerable distance, and considerable labor is involved in making a proper installation. Adequate supplies of sod may not be available. In case of a heavy rain, water gets under the sod and erodes the sub-soil, and may cause the sod to slide down the slope unless thoroughly pegged. Furthermore, sod generally does not provide a high quality grass coverage and usually contains weeds, so that several years of careful working may be needed to establish a high quality lawn.

Tests have demonstrated that our self-retentive seed fabric is easily installed on slopes and embankments and that its use avoids the disadvantages of conventional seeding and of sodding noted above. The economic benefits can be substantial, as when many miles of highway cuts and embankments are to be grassed to inhibit soil erosion and sliding, and for appearance. Three pounds of our seed fabric can be equal in ground-covering area to about 2000 pounds (one ton) of sod of average weight.

Our grass-seed fabric can be readily and continuously manufactured by superimposing a pair of carded webs of staple rayon (or equivalent) textile fibers of at least one inch length (which are water-insoluble but hydrophilic and water-absorptive), the lower web carrying on its upper (inner) side the grass seed that has previously been uniformly distributed thereon in the desired quantity per unit area, thereby enveloping the seed within the composite fibrous structure; thereafter subjecting the composite web to soft-pressing between rolls and to sizing with an aqueous solution of the agglutinant sizing agent; and thereafter drying the seed-containing fibrous web at a temperature which does not impair the seed, and winding up to provide stock rolls of the dry, unified, finished product. This seed fabric can be rewound to provide rolls of desired length for sale, including slitting to provide webs of desired lesser width. The sizing solution may include a dye to impart a green color (or any other desired color) to the fabric if precolored fibers are not employed.

In the carded fibrous web structure the interlaced long staple fibers cross over and under each other and are so closely meshed that the dry seed can be retained in the initial dry fibrous structure prior to sizing, thereby avoiding any need of sizing prior to assembly of the composite "sandwich" structure. The agglutinant sizing agent thereafter unifies the structure by adhering the seed particles to the fibers and adhering the fibers to each other at their crossing points. The soft-pressing removes excess sizing solution and compacts the fluffy web to a damp tissue-like condition. The sizing agent forms extremely thin water-absorptive and water-softenable agglutinant coatings on the fibers and seeds and does not interfere with proper seed germination. It is gradually dissipated from the fibers after application of the seed fabric to the earth and repeated wettings, so that the fabric can gradually disintegrate after serving its function. Disintegration is gradual because of the interlaced relationship of the relatively long staple fibers.

A preferred procedure for manufacturing our grass-seed fabrics will now be described in detail in connection with the accompanying drawings, wherein:

Fig. 1 is an enlarged diagrammatic edgewise view of a seed-containing fabric product; and Fig. 2 is a diagrammatic elevation view serving as a flow-sheet and illustrating apparatus employed in the manufacture of the product.

Referring to Fig. 1 (which is schematic and greatly exaggerated as to thickness), the green-colored grass-growing fabric 1 is a nonwoven porous seed-containing compacted tissue web formed of two plies of carded green rayon staple fibers (or the like), 2 and 3, which merge together so as to be indistinguishable in the product. The grass seeds 4 are uniformly distributed upon the lower ply 3 and thus are enveloped by the plies and imprisoned within the fibrous body of the composite fabric web. Owing to the compaction and thinness of the fibrous tissue structure of the seed-containing product, the seeds may project considerably into both plies (as indicated in the drawing). Large seeds (which may even have a thickness greater than the average thickness of the tissue) form bulges. The seed-containing web is unified by a water-softenable film-forming colloidal agglutinant sizing which forms invisibly thin transparent coatings on the fibers and seeds, and temporarily adheres the fibers to each other at their crossing points and also adheres the seeds to the contacting fibers, thereby unifying the seed-containing fabric product and imparting initial dry strength. (These coatings are not shown in the drawing because of their extreme thinness.)

The staple fibers may be formed into continuous carded webs by a Garnett machine or the like. Equivalent fibrous webs may be made in other ways, as by use of "Rando-Webber" machines (sold by Curlator Corp., Rochester, N.Y.). In any case the non-bundled staple fibers are randomly interlaced into a loose fluffy web wherein the fibers cross over and under each other so as to be held together by mechanical and frictional forces in three dimensions. The resultant fibrous web may be identified as a "carded web" on the basis of characteristic fibrous structure even when not literally made by a carding procedure in the strict sense.

A single Garnett machine can be employed to continuously provide a pair of carded webs; these webs being successively taken off the main cylinder bat by a pair of doffing cylinders from which they are removed and ejected by a comb.

The staple fibers (chopped from continuous filaments) should have a length of at least one inch. An average length of about 1½ inches is preferred. Fibers of fine denier size should be employed, preferably in the range of 1 to 3 denier. The fiber weight of the fabric product should be in the range of about 20 to 60 pounds per thousand square yards. The component carded webs may be equal in weight (each weighing half as much as the composite web), or one may be heavier as where it is desired to provide a product which when applied to the ground will have a substantially greater thickness of fibers overlying the seeds than underlying them. A total fiber weight of about 30 pounds per thousand square yards has been found quite satisfactory, the two component webs being approximately equal in weight and each weighing approximately one-fourth ounce per square yard. This construction results in a final product which is diaphanous and yet has adequate strength and seed-holding characteristics. Precolored spun-dyed green fibers are preferably employed so as to obtain a color-stable green fabric product.

Rayon fibers (regenerated cellulose fibers) are preferred but use can also be made of cellulose acetate textile fibers (which sometimes used to be termed "acetate rayon" fibers), preferably in admixture with rayon fibers. These acetate fibers are formed of incompletely acetylated cellulose. Both types of regenerated cellulosic staple fibers are water-insoluble but are hydrophilic (water-wettable) and are water-absorptive (holding more than their weight of water when soaked). They become limp when wet. Rayon textile fibers are more absorptive of water than are acetate textile fibers and this is one reason for preferring them and for using a mixture when acetate fibers are used; thus a mixture of equal parts by weight of the two types has been found quite satisfactory. Both types are weaker when wet than when in dry equilibrium with the atmosphere, but have adequate wet-strength for present purposes. Other man-made organic staple fibers are available which have suitable properties and are equivalent, but they are too expensive for present usage. Natural cellulose fibers (such as cotton fibers and wood fibers) are unsuitable, as are glass fibers. Fibers which are water-repellent are not suitable.

Referring now to Fig. 2, a pair of green-colored fluffy carded fibrous webs of the character described above, 10 and 11, coming from a Garnett or other web-forming machine (not shown) in aligned edge-over-edge relation, are laid down upon endless carrier belts 12 and 13 respectively. The lower carrier belt 13 slopes upwardly and extends beyond but near to the far end of the upper carrier belt 12, the arrangement being such that the upper carded web 10 is deposited upon the lower carded web 11 to form a merged composite web that is then transferred to a further, upwardly sloping, endless carrier belt 14.

Located above said lower carrier belt (and below the overlying upper carrier belt) is a seed distributor 15. This may, for instance, comprise a seed hopper (fed from one side by a screw conveyor) and a fluted seed-metering roll. The seed distributor continuously dispenses seeds at the desired rate over the width of the carded web, the seeds 9 falling therefrom upon a sloping vibrating plate 16 and then falling upon the lower carded web 11 as it moves forwardly, so as to deposit seeds thereon in a uniform manner to provide the predetermined seed weight per unit area. These seeds are trapped and held in the fibrous structure of the web and are further enveloped when the upper carded web is deposited thereon.

The resultant seed-containing composite carded fibrous web 17 is carried by the endless belt 14 and fed into the nip of horizontal squeeze rolls 18 and 19. These squeeze rolls are driven and may have a diameter of 12 inches. The upper one 18 is rubber-covered and rough-surfaced to provide a non-sticking resilient tractive surface. The lower one 19 has a knurled steel surface and dips into the bath 20 of aqueous solution of agglutinant sizing agents; rotation of this roll carrying sizing solution to the nip to thoroughly wet and impregnate the fibrous web. The roll pressure is adjusted so that excess sizing solution is squeezed out and the fluffy carded fiber web is compacted, resulting in a damp tissue-like fibrous web 21. This soft-pressing action is entirely different from the hard-pressing that occurs when a fabric is calendered between hard-surfaced calender rolls, and avoids crushing of seeds and mashing or cutting of the damp fibers at their crossing points. The compacted fibrous structure conforms to the seeds and bulges may be formed by large seeds. (If precolored fibers are not employed, a dye can be included in the bath so as to permit of simultaneous sizing and coloring of the web.)

This damp sized seed-containing tissue web 21 is laid down on an upwardly sloping endless drier belt 22 formed of woven wire and provided with underlying air-suction means (not shown, since suction driers are well known). The web is held down flat by the suction and by its wet adhesion to the belt and becomes dry within a few seconds even when dried by room air drawn therethrough. The drying rate can be increased by employing heaters to supply warm air, in which case the temperature should be kept low enough to maintain the seeds in a viable state. A warm air temperature of 180° F. is satisfactory. The wetting and drying takes place so rapidly that viability of the seed is not altered.

The resultant dry seed fabric product 23 is peeled from the drier belt during return travel, passing down around idler roll 24 to a wind-up machine (not shown) where it is wound into a large stock roll 25. The fabric web can subsequently be slit and rewound to provide rolls of desired width and length for sale.

The functions of the agglutinant sizing agent have previously been indicated in respect to the properties of the seed fabric product both before and after it is applied to the ground. It has been found that the requirements can be met by a variety of agglutinants. The transparent dried coatings initially present on the fibers and seeds are of extreme thinness. Extremely thin coating films have properties not always apparent from the properties of thick films or of the bulk material. Thus an acrylic polymer latex sizing has been found satisfactory, the film of colloidal latex particles being permeable to moisture and softening when damp, even though a solid mass or a thick coating of dried polymer is highly water-proof and resistant to moisture absorption. The result is that the fabric has little wet tensile strength and upon wetting it can be pulled apart due to weakening of the fiber-to-fiber bonds. The sizing agents may be characterized as water-softenable film-forming colloidal agglutinants; the term "water-softenable" referring to the agglutinant when in the form of a thin sizing film.

Proteinaceous agglutinants (such as casein) can be employed but are not recommended, owing to odor, tendency to putrefy when damp, and possible interference with seed germination. Examples of good non-proteinaceous agglutinant sizing agents are polyvinyl alcohol (preferably of the cold-water-soluble type), carboxy methyl cellulose (preferably of the high-viscosity type) and hydroxy ethyl cellulose. An example of an acrylic polymer latex is "Rhoplex AC-33" sold by Rohm & Haas Co. Further examples are paper-sizing starch derivatives such as acetylated starch and ethylene oxide starch ethers.

The agglutinant is applied to the seed-containing fibrous web as a dilute aqueous solution; i.e., as a dilute colloidal dispersion in water. The use of a dilute solution and of the previously-mentioned squeeze-roll application technique, results in very thin transparent coatings in the finished dry product and imparts an agglutinant sizing weight (dry solids basis) in the range of about 1 to 10% of the dry fiber weight. The optimum value depends upon the particular agglutinant. The fine fibers provide a very high total fiber surface area per unit of weight. The agglutinated fibers cling to the soil when the seed fabric is first applied and wetted down and continue to cling even if the fabric is permitted to dry out, owing in part to the dimensional stability of the fibrous structure. The agglutinant coatings remain on the fibers for a considerable period; gradually washing off with repeated wetting. Fiber-to-soil bonding continues owing to the intimate contact and the hydrophilic or water-absorptive nature of the fibers employed.

The sizing bath can be employed not only for incorporating agglutinant and coloring agents (as previously described) but for simultaneously incorporating other agents, such as disinfectants, fungicides, animal-repellents, nutriments, or plant hormones.

The choice and weight of grass seed to be incorporated in the fabric will of course depend upon usage conditions and economic factors. A variety of products may be designed for sale, each best adapted for a particular class of users in a particular geographical section. Use of our seed fabric permits of greatest economy in seed cost per unit of area of ground to be covered, since the seed is utilized more efficiently than when sown. Hence the usual recommended area weights of seed for sowing can be reduced. An unduly high seed distribution density is actually detrimental since the seeds compete for available moisture and nutriment. Mixtures of different types of seeds are commonly employed in the planting of lawns. Thus a coarse seed of a quick-growing sturdy grass may be combined with a fine seed of a high-quality slowly-maturing grass. All such grass seed mixtures can be readily incorporated in the manufacture of our product. A feature of our product is that it permits grass to be grown in open types of soil where direct sowing of seed would result in penetration into deep soil interstices and prevent proper germination of seed and growth of seedlings. A striking example is the coral sand soil of Florida and the problem of growing centipede grass therein.

*Example*

This example illustrates the manufacture of a green grass-seed fabric using the previously described procedure and equipment.

The carded webs are formed on a Garnett machine and each weighs ¼ ounce per square yard to produce a combined weight for the pair of about 30 pounds per thousand square yards. Each of the initial fluffy carded webs has a thickness of about ½ inch, and the composite seed-containing web as fed to the squeeze rolls is about one inch thick. The fibers are commercially-available grass-green spun-dyed viscose rayon staple textile fibers of medium (regular) tenacity, 1.5 denier, and 1½ inch length. The agglutinant sizing bath is a 0.5% (by weight) solution in water of high-viscosity type carboxy methyl cellulose, and may include a wetting agent although this is not necessary. The agglutinant has a dry solids weight in the product of 0.3 pound per thousand square yards. The seed-containing tissue product has an average caliper thickness of about 0.006 inch in the areas between the seeds.

The grass seed is incorporated in the amount of 36 pounds per thousand square yards. A suitable illustrative mixture for use in making lawns in north temperate regions is, in parts by weight: creeping red fescue grown in Canada (19 parts), domestic rye grass shown in Oregon (40 parts), Kentucky-type blue grass grown in Minnesota (36 parts) and inert matter commonly contained in seed mixtures (5 parts). It will be noted that the grass seed accounts for slightly more than one-half of the total weight of the seed-containing fabric, owing to the lightness of the diaphanous agglutinated fibrous structure.

A roll of seed fabric one foot wide and 15 yards long is a convenient size for small plots and for patching usage; whereas a width of three or six feet and a length of 100 or 500 yards is a suitable size for making lawns and for large scale application to highway embankments, for instance. Applicators can be employed. An applicator attached to the back or side of a small tractor or motor vehicle permits of rapid labor-saving laying of the seed fabric over large areas.

The following procedures are recommended in using the seed fabric to obtain best results in making a good lawn:

The soil is prepared in the usual way with a light final raking (if needed) to break the top soil surface. Rolls of seed fabric as required are rolled out on the surface with strips being overlapped at least one inch. On slopes or terraces the fabric may be laid either vertically (top to bottom) or horizontally (working from the bottom of the slope upward so each strip can be overlapped on the next lower strip). On steep slopes the fabric is best rolled down the slope to provide edge-overlapping strips, with a further overlapping strip being applied across the top of the slope. As each strip is laid, spray lightly to hold in place. After a substantial area is covered, thoroughly soak down with a gentle hose spray. Avoid walking on the covered area. Keep the seed fabric moist while the seed is germinating. This may require three or more weeks before the most slowly germinating seed has completely germinated. Wait until the grass is about three inches high before cutting. By this time the fabric will have completely disintegrated and the fibers will have worked into the soil so as not to interfere with mowing or raking. No trashy residue is formed.

We claim:

1. A thin lightweight porous seed-containing grass-growing fabric adapted for use as herein described, consisting of a nonwoven porous compacted fibrous tissue web of nonbundled interlaced water-insoluble hydrophilic water-absorptive regenerated cellulosic staple fibers of at least one inch length, having grass seeds distributed within the fibrous body of the web, the seed-containing web being sized with a water-softenable film-forming colloidal agglutinant that provides extremely thin coatings on the fibers and seeds and temporarily binds the fibers to each other and the seeds to the fibers so as to unify the porous fabric product in its initial dry state.

2. A seed-containing fabric according to claim 1, having a grass-green color.

3. A roll of green-colored grass-seed fabric consisting of a nonwoven porous compacted fibrous tissue web formed of two contacting seed-enveloping plies of grass-green spun-dyed carded rayon staple fibers of 1 to 3 denier and at least one inch length, the total fiber weight being in the range of 20 to 60 pounds per thousand square yards, having grass seed uniformly distributed within the fibrous web, the seed-containing web being sized with a water-softenable film-forming colloidal agglutinant that provides extremely thin coatings on the fibers and seeds and temporarily binds the fibers to each other and the seeds to the fibers so as to unify the porous fabric product in its initial dry state.

4. A continuous process of manufacturing a grass-seed fabric of the character described which comprises providing and continuously advancing two component carded webs of water-insoluble hydrophilic water-absorptive regenerated cellulosic staple fibers of at least one inch length, uniformly distributing grass seeds upon one of said webs and plying the webs together with the grass seeds inside, compacting the composite web by soft-pressing and impregnating without excess with an aqueous solution of a water-softenable film-forming colloidal agglutinant sizing agent, thereby forming a damp porous compacted seed-containing tissue fabric having extremely thin agglutinant coatings on the fibers and seeds, and drying the fabric at a temperature insufficient to impair the seeds and winding into a roll.

5. A process according to claim 4 wherein grass-green spun-dyed rayon fibers are utilized whereby a grass-green color is imparted to the product.

References Cited in the file of this patent

UNITED STATES PATENTS

| 2,648,165 | Nestor | Aug. 11, 1953 |
| 2,826,865 | Chohamin | Mar. 18, 1958 |